3,415,763
METHOD OF MAKING FOAMED PHENOLIC
RESINS AND PRODUCT OBTAINED THERE-
FROM
Lawrence F. Sonnabend, Midland, Mich., assignor to The
Dow Chemical Company, Midland, Mich., a corporation of Delaware
No Drawing. Filed Apr. 18, 1966, Ser. No. 543,065
4 Claims. (Cl. 260—2.5)

ABSTRACT OF THE DISCLOSURE

The invention relates to a process for making a rigid thermoset foam which comprises heating in the presence of a Friedel-Crafts catalyst a mixture of a fusible phenol-chloromethylated diphenyl ether condensation product with a lower alkoxymethylated diphenyl ether in an amount sufficient to provide 0.5–2 alkoxy groups per phenol unit in said condensation product, said alkoxymethylated diphenyl ether having an average of 1.5–4 alkoxymethyl groups per diphenyl ether unit.

---

This invention relates to new insoluble crosslinked polymers of substituted aromatic ethers and to a method for making these new resins. More particularly, it relates to rigid thermoset foamed polymers of improved properties made by reacting a copolymer of chloromethylated diphenyl ether with a derivative of that ether.

It is known that chloromethylated diphenyl ethers having more than one chloromethyl group per diphenyl ether unit can be converted into rigid thermoset foams by heating in the presence of an acidic catalyst. The foaming action results from the liberation of hydrogen chloride during the condensation reaction. The large volumes of hydrogen chloride liberated from the foam as well as the small amounts remaining in the polymer cause corrosion and related problems and render this method impractical.

It is also known that chloromethylated diphenyl ethers as described above can be reacted with phenols to prepare intermediate resins which then can be further reacted with formaldehyde, epoxides, or polybasic acids to obtain resins of various types useful in preparing coating compositions.

It has now been found that rigid thermoset foams of improved strength and of uniformly high quality are obtained when the soluble fusible intermediate resin obtained by reacting phenol with a polychloromethylated diphenyl ether is heated in the presence of an acid catalyst with a poly lower alkoxymethylated diphenyl ether. Such alkoxymethylated ethers have the formula

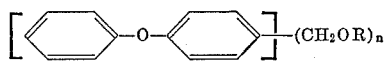

where $n$ is an average value and is 1.5–4, and R is lower alkyl, i.e., of 1–4 carbon atoms. These materials are obtained by reacting the corresponding chloromethylated diphenyl ether with a lower alkanol in the presence of a base according to known procedures.

The intermediate phenolic resin consists essentially of alternating phenol units and diphenyl ether units connected through methylene bridges. Such intermediate resins having an average molecular weight of 500–1500 are particularly suitable for use in the present invention. In the practice of this invention, the intermediate resin is reacted with sufficient of the alkoxymethylated diphenyl ether to provide 0.5–2 alkoxymethyl groups per phenol unit. The foaming reaction is carried out at a temperature of about 70–160° C., at which temperature a condensation reaction takes place between the alkoxymethyl groups and reactive nuclear hydrogen atoms on the phenol units of the intermediate phenolic resin. The alkanol ROH is thereby liberated and, since the condensation is carried out at a temperature within the above range and above the normal boiling point of the alkanol, it serves as a blowing agent to produce the desired foam. The density of the foam can be adjusted as desired by regulating the reaction temperature. Foams having densities of 1–15 lbs. per cubic foot are thereby obtained. These foams are hard and tough and are more resistant to crumbling as compared to prior art phenolic foams. They will not support combustion and merely char upon exposure to a flame.

The acid catalysts useful in the foaming process are Friedel-Crafts catalysts which are conventionally used in this general kind of reaction. They include boron trifluoride, zinc chloride, aluminum chloride, ferric chloride, sulfuric acid, toluenesulfonic acid, phosphoric acid, and other such acidic materials known to be equivalent for the purpose. Only catalytic quantities are required.

Best results are usually obtained when the foaming reaction is carried out at about 90–140° C. using an ethoxylated diphenyl ether. A heating time of 1–50 minutes is sufficient to obtain a substantially complete reaction and about 5–30 minutes is usually preferred.

EXAMPLE 1

A soluble and fusible intermediate phenolic resin was prepared by adding 136 lbs. of chloromethylated diphenyl ether to a solution of 96 lbs. of phenol in 40 lbs. of chlorobenzene at 90–100° C. The chloromethylated diphenyl ether starting material analyzed 25.4 percent chlorine and contained 70–75 mole percent bischloromethylated ether, about two-thirds of which was the p,p'-isomer and the rest was largely the o,p'-compound, about 18 mole percent of tri- and tetrachloromethylated ether, and the rest was largely monochloromethylated ether. Solvent and excess phenol were distilled from the reaction mixture, terminal conditions being 180° C. pot temperature and 10 mm. absolute pressure. The polymer thereby obtained was a yellow resin, weight 166 lbs., average molecular weight 805, Durran softening point 77.1° C., and analyzing 7.55 percent by weight hydroxyl groups.

A mixture of 338 g. of this intermediate resin was mixed with 211 g. of an ethoxymethylated diphenyl ether containing about 10 mole percent monomethoxylated ether, 70 percent diethoxylated ether of about two to one p,p'-o,p' isomer distribution, and the remainder largely triethoxylated ethers. The ethoxymethylated ether had been prepared by reacting a chloromethylated diphenyl ether of corresponding structure with excess ethyl alcohol in the presence of sodium hydroxide equivalent to the total chlorine present. Boron trifluoride-ethyl ether complex was added to 60 g. portions of the above mixture and these were heated for thirty minutes at different temperatures to obtain firm thermoset foams with varying densities as shown.

| Sample | Ml. BF₃ complex | Temp., ° C. | Foam density, lbs./cu. ft. |
|---|---|---|---|
| A | 1.5 | 125 | 3.1 |
| B | 1.5 | 115 | 6.0 |
| C | 2.0 | 100 | 13.5 |

The larger amount of BF₃ catalyst was used with sample C to balance the effect of the lower temperature on the reaction rate.

Samples of a chloromethylated diphenyl ether mixture similar in composition to that used to prepare the intermediate phenolic resin of Example 1 were reacted with methyl alcohol, and n-butyl alcohol respectively in the presence of sodium hydroxide to prepare the corresponding alkoxylated diphenyl ether mixtures. These were then reacted with the same phenol-chloro-methylated diphenyl ether intermediate resin (Resin A) used in Example 1 to obtain rigid thermoset foams as described in Examples 2–5.

Example 2

A mixture of 100 g. Resin A and 50 g. of methoxymethylated diphenyl ether (about 22 weight percent methoxy groups) was prepared. To 30 g. of this mixture there was added 1.2 ml. of $BF_3$ etherate and this mixture was heated at about 150° C. for ten minutes. A rigid thermoset foam was obtained which had properties similar to those of foam sample B above.

Example 3

One milliliter of $BF_3$ etherate was added to a mixture of 16.9 n-butoxymethylated diphenyl ether (43 weight percent butoxy groups) and 21.3 g. of Resin A. This foamed when heated to 130° C. to produce a rigid thermoset foam having a density similar to that of foam sample C.

Example 4

A milliliter of $BF_3$ etherate was added to a mixture of 15.9 g. n-propoxymethylated diphenyl ether (39 weight percent propoxy groups) and 21.3 g. of Resin A. This foamed when heated to 130° C. to produce a rigid thermoset foam having properties similar to those of foam sample B above.

Example 5

A mixture of 100 g. of Resin A and 141 g. of methoxymethylated diphenyl ether (22 weight percent methoxy groups) was prepared at 100° C. Two 30 g. portions were mixed with 1 g. of 50 percent $H_2SO_4$ and with 2 g. of 50 percent p-toluenesulfonic acid in methanol respectively. These were heated for about 10 minutes at 120° C. to produce rigid thermoset foams similar to the product of Example 2.

I claim:
1. A process for making a rigid thermoset foam which comprises heating at 70–160° C. in the presence of a Friedel-Crafts catalyst a mixture of a fusible phenol-chloromethylated diphenyl ether condensation product with a lower alkoxymethylated diphenyl ether in an amount sufficient to provide 0.5–2 alkoxymethyl groups per phenol unit in said condensation product, said alkoxymethylated diphenyl ether having an average of 1.5–4 alkoxymethyl groups per diphenyl ether unit.
2. The process of claim 1 wherein the mixture is heated at 90–140° C. for 1–50 minutes.
3. The process of claim 2 wherein the alkoxymethylated diphenyl ether is ethoxymethylated diphenyl ether.
4. The rigid thermoset foam product of the process of claim 1.

References Cited

UNITED STATES PATENTS

| | | | |
|---|---|---|---|
| 2,911,380 | 11/1959 | Doedens | 260—2.5 |
| 3,047,518 | 7/1962 | Doedens et al. | 260—2.5 |
| 3,128,259 | 4/1964 | Sonnabend | 260—18 |

FOREIGN PATENTS 956,335  4/1964  Great Britain.

MURRAY TILLMAN, *Primary Examiner.*

M. FOELAK, *Assistant Examiner.*

U.S. Cl. X.R.

260—47